US006965979B2

United States Patent
Burton

(10) Patent No.: US 6,965,979 B2
(45) Date of Patent: Nov. 15, 2005

(54) METHODS AND SYSTEMS OF HOST CACHING

(75) Inventor: David Alan Burton, Vail, AZ (US)

(73) Assignee: Pillar Data Systems, Inc., San Jose, CA (US)

( * ) Notice: Subject to any disclaimer, the term of this patent is extended or adjusted under 35 U.S.C. 154(b) by 393 days.

(21) Appl. No.: 10/354,797

(22) Filed: Jan. 29, 2003

(65) Prior Publication Data

US 2004/0148486 A1 Jul. 29, 2004

(51) Int. Cl.[7] .............................................. G06F 12/00
(52) U.S. Cl. ........................ 711/202; 711/119; 711/129
(58) Field of Search ........................ 711/119, 124, 173, 711/161, 162, 129, 202

(56) References Cited

U.S. PATENT DOCUMENTS

| | | | |
|---|---|---|---|
| 5,437,022 A * | 7/1995 | Beardsley et al. ............. 714/6 |
| 5,586,291 A | 12/1996 | Lasker et al. | |
| 5,636,355 A | 6/1997 | Ramakrishnan et al. | |
| 5,640,530 A * | 6/1997 | Beardsley et al. .......... 711/113 |
| 5,724,501 A | 3/1998 | Dewey et al. | |
| 5,761,705 A | 6/1998 | DeKoning et al. | |
| 5,771,367 A * | 6/1998 | Beardsley et al. .......... 711/162 |
| 5,784,548 A | 7/1998 | Liong et al. | |
| 5,802,561 A | 9/1998 | Fava et al. | |
| 5,974,506 A | 10/1999 | Sicola et al. | |
| 6,279,078 B1 | 8/2001 | Sicola et al. | |
| 6,321,298 B1 | 11/2001 | Hubis | |
| 6,381,674 B2 | 4/2002 | DeKoning et al. | |
| 6,438,647 B1 | 8/2002 | Nielson et al. | |
| 6,480,970 B1 | 11/2002 | DeKoning et al. | |
| 2001/0002480 A1 | 5/2001 | DeKoning et al. | |
| 2003/0126494 A1 * | 7/2003 | Strasser ........................ 714/6 |
| 2003/0158999 A1 * | 8/2003 | Hauck et al. ............... 711/113 |
| 2004/0059869 A1 * | 3/2004 | Orsley ........................ 711/114 |

* cited by examiner

Primary Examiner—Behzad James Peikari
Assistant Examiner—Woo H. Choi
(74) Attorney, Agent, or Firm—Robert Moll

(57) ABSTRACT

The invention relates to host caching in data storage systems. In an embodiment, the invention provides a first host and a second host, each having memory. The host memory includes nonvolatile and volatile portions available for cache. Each host logically owns its volatile memory and the other host's nonvolatile memory. By assigning ownership in this way data can be transmitted between the hosts with little communication overhead. In addition, if the first host fails between write acknowledgment and destaging the write data, the write data is safely stored in the second nonvolatile memory of the second host. Thus, the second host can destage the data from the second nonvolatile memory. In addition, the host cache writes and reads the data rapidly by its nature.

25 Claims, 10 Drawing Sheets

METHODS AND SYSTEMS OF HOST CACHING

BACKGROUND

The present invention relates to host caching in data storage systems.

Computer networks, distributed systems, inexpensive and powerful computers, and databases have all contributed to the general need for data storage systems having fast I/O rates. Online transactions processing (OLTP) is particularly concerned with achieving fast I/O rates. Some examples of OLTP today are e-commerce, web sites, automated teller machines, and online financial services that typically must support many users making many I/O requests on a shared pool of information.

Data storage systems store the data in an array of storage devices such as magnetic disks. However, the access time of a magnetic disk even in an array will not come close to matching the access time of volatile memories used today in data storage systems. The average memory access time of an individual magnetic disk is 5 ms, while that of a typical dynamic random access memory (DRAM) is 30–100 ns. Unlimited amounts of a fast memory such as DRAM would help achieve faster I/O rates, but cannot be provided economically. Instead, computer architects must exploit the principle of locality—temporal and spatial locality—to create the illusion of having unlimited amounts of inexpensive fast memory. Temporal locality means that recently accessed data and instructions are likely to be accessed in the near future. Spatial locality means that data and instructions with addresses close to each other tend to be accessed together.

To increase the I/O rates we must retrieve data from fast memory whenever possible. DRAM is such memory, but is much more expensive than magnetic disks on a per byte basis, so we cannot store all the data in DRAM. One solution is to provide DRAM as a cache to store the most recently used (or likely to be used) data. When a processor finds the data in the cache, called a cache hit, the data is read from the DRAM. If the processor does not find the data in cache, called a cache miss, the data must be read from the magnetic disk. As long as the cache hit ratio is high and the miss penalty small, data storage systems benefit from a caching system.

Caches can be implemented in different components of a data storage system. In many systems, caching is associated with a disk array controller. However, caching in the disk array controller is slow compared to host caching. In some host caching, the main memory includes a cache allocation and resides on the CPU-memory bus with the processor(s) permitting fast communication. However, if the host processor acts as the cache controller, it will expend host processor resources that may be busy handling all of the I/O requests. If the host is too busy managing other activities than cache management, then the memory and CPU time available for cache will be overly constrained and result in suboptimal host system performance.

Although reads dominate processor cache access, writes distinguish cache designs. Because write through requires that the data be written to cache and the storage devices before the write is acknowledged, most data storage systems primarily employ a write back cache, where the data is written to cache, and a write acknowledgment is returned prior to writing to the storage devices thus improving system performance. However, the write data in DRAM cache will be lost if there is a power interruption or failure before the modified data is written to the storage devices. A battery can preserve the data if external power is interrupted. However, it is prohibitively expensive to battery back the entire volatile memory as memories have become large. Today, 4 GB to 128 GB caches are commonly used in systems.

One disk storage subsystem includes a disk controller with a microprocessor coupled to a cache memory. A cache memory control circuit is coupled to volatile and non-volatile memory modules. In response to a write command received from a host computer, the microprocessor allocates memory blocks in the non-volatile cache memory modules. After allocation, the disk controller selects and allocates corresponding memory blocks in the volatile memory modules. Host supplied write-data is then stored in the allocated non-volatile memory module. Immediately thereafter the subsystem sends an acknowledgment signal to the host computer that the write operation is complete. A cache memory control circuit then performs a direct memory access (DMA) operation to copy the write-data from the allocated memory blocks of the non-volatile memory module to the corresponding allocated memory blocks of the volatile memory module. The write-data is then stored on a disk drive at which point the allocated memory blocks of the non-volatile memory are de-allocated and thus made available for further use.

There are several problems with this disk controller based cache design. First, there is the overhead of the allocation and de-allocation of addresses in the volatile and nonvolatile memory blocks during the write operation. Second, if the disk controller fails between the write acknowledgment and destaging, the data is only in the nonvolatile memory of the disk controller. Thus, the disk controller must be removed from service so the non-volatile memory with the only copy of the data can be physically transferred to a different disk controller, assuming one is available. The disk controller based cache also cannot retrieve data as rapidly as a host cache.

SUMMARY OF THE INVENTION

The present invention relates to caching in hosts where each host includes volatile memory for read and write and nonvolatile memory for write cache. In an embodiment, the first host includes a first volatile memory and a first nonvolatile memory, the second host includes a second volatile memory and a second nonvolatile memory, and an interconnect coupling the first host to the second host. Under control of the first host, software maps addresses of the first volatile memory as dedicated to the first host, and maps the addresses of the first nonvolatile memory as dedicated to the second host. Under control of the second host, software maps the addresses of the second volatile memory as dedicated to the second host and maps the addresses of the second nonvolatile memory as dedicated to the first host. In response to a write request received by the first host, the first host stores the write data in the first volatile memory, transmits the write data through the interconnect, stores the write data in the second nonvolatile memory and acknowledges the write operation is complete.

In a write back cache embodiment, when the first host receives a write request, the first host stores the write data in a first volatile memory, mirrors the write data in a second nonvolatile memory, and acknowledges the write is complete after storing the write data in the second nonvolatile memory. This overwrites existing data in the first volatile memory eliminating the need to invalidate the old data.

In a write through host cache embodiment, a first host includes a first volatile memory and a first nonvolatile memory, a second host including a second volatile memory and a second nonvolatile memory, and an interconnect coupling the first host and the second host. Software under control of the first host maps the addresses of the first volatile memory as dedicated to the first host, and maps the addresses of the first nonvolatile memory as dedicated to the second host, wherein if the first host detects that the second host has failed and receives a write request, the first host stores the write data in the first volatile memory, destages the write data, and acknowledges the write operation is complete.

DETAILED DESCRIPTION OF THE PREFERRED EMBODIMENTS

The following description includes the best mode of carrying out the invention. The detailed description is made for the purpose of illustrating the general principles of the invention and should not be taken in a limiting sense. The scope of the invention is determined by reference to the claims. Each part is assigned its own part number throughout the specification and drawings.

Figure 1:
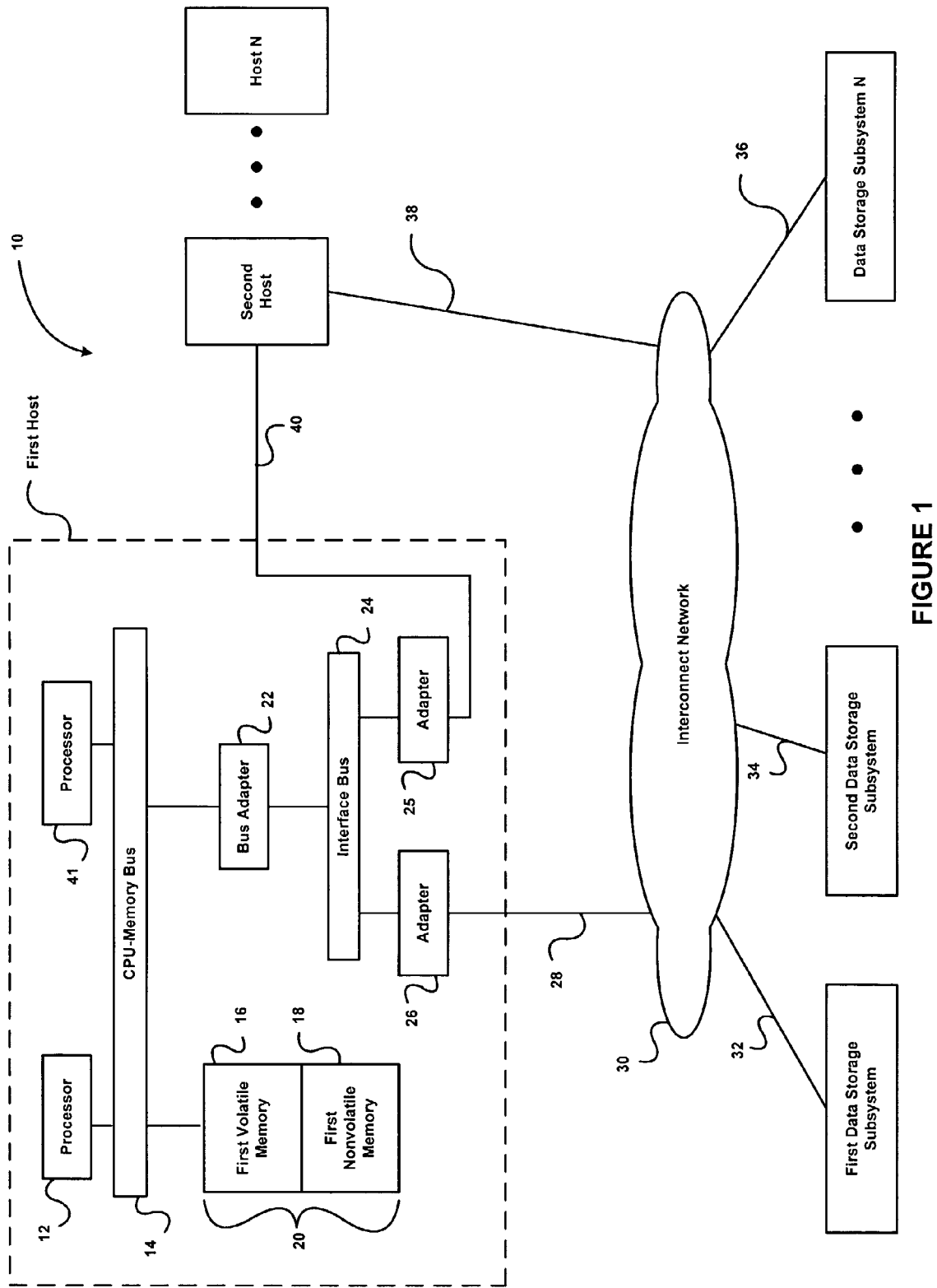
FIG. 1 illustrates an embodiment of a data storage system.

FIG. 1 illustrates a data storage system 10, including a plurality of hosts coupled to data storage subsystem(s). Each host is a computer that can connect to client(s), to data storage subsystem(s), and each other. Each host provides software/hardware interfaces such as network interface cards and software drivers to implement Gigabit Ethernet, Ethernet, Fibre Channel, ATM, and SCSI, and Infiniband. Hennessy and Patterson, *Computer Architecture: A Quantitative Approach* (2003), and Patterson and Hennessy, *Computer organization and Design: The Hardware/Software Interface* (1998) describe computer hardware and software, storage systems, caching, and networks and are incorporated by reference.

In an embodiment, the first host includes a PC motherboard with a CPU-memory bus 14, that communicates with dual processors 12 and 41. The processor used is not essential to the invention and could be any suitable processor such as the Intel Pentium 4 processor. Also, one could implement the invention using a single processor in each host or more than two processors to meet more stringent performance requirements. The arrangement of the processors is not essential to the invention.

The first host memory 20 includes a first nonvolatile memory 18 and a first volatile memory 16. The first nonvolatile memory 18 protects data in the event of a power interruption or a host failure. Data is defined as including user data, instructions, and metadata. The nonvolatile memory may be implemented with a battery that supplies power to the DRAM to make it nonvolatile memory when a conventional external power interrupt circuit detects that an interruption as will be described below or by a nonvolatile semiconductor memory.

Each host includes a bus adapter 22 between the CPU-memory bus 14 and an interface bus 24. Each host runs an operating system such as Linux, UNIX, a Windows OS, or another suitable operating system. Tanenbaum, *Modern Operating Systems* (2001) describes operating systems in detail and is hereby incorporated by reference. The first host is representative of the other hosts, but this feature is not essential to the invention.

The first host can communicate with the second host through an interconnect 40, shown as connected to an adapter 25 to the interface bus 24. The PCI bus is one suitable interface bus and the interconnect 40 may be any suitable known bus, SAN, LAN, or WAN technology. In an embodiment, the interconnect 40 is a dedicated Fibre Channel (FC) point-to-point link that connects to FC-PCI bus adapter 25 to provide fast point-to-point communication between the hosts.

In an alternative embodiment, the interconnect network 30 such as a FC fabric provides extra bandwidth for host-to-host communications. In this embodiment, links 28, 38 connect to the interconnect network 30 and the hosts use link 28 and link 38 when available. FC standard software can set priority levels to ensure high priority peer-to-peer requests but there will still be some arbitration overhead and latency in claiming ownership of the links. For example, if links 28 and 38 are busy transferring data when a write request arrives, that operation must complete before either link is free for arbitration.

If the interconnect 40 ever fails, communication between hosts can be handled using the interconnect network 30. The interconnect network 30 can be implemented by interconnects used in data storage systems such as Fibre Channel, SCSI, Infiniband, or Ethernet, and again the type of interconnect is not essential to the invention. In either embodiment, redundant communication between hosts ensures the data storage system has high availability. See Clark, *IP SANs: A Guide to iSCSI, iFCP, and FCIP Protocols for Storage Area Networks* (2002) and Clark, *Designing Storage Area Networks* (1999) are incorporated herein by reference.

In an embodiment, the data storage subsystems shown in FIG. 1 can be those described in the co-pending and co-assigned U.S. patent application Ser. No. 10/264,603, entitled, Systems and Methods of Multiple Access Paths to Single Ported Storage Devices, filed on Oct. 3, 2002, and incorporated herein by reference. It is understood, however, that other storage device(s) or data storage subsystems could be used instead of the data storage subsystem described in this U.S. patent application.

As shown in FIG. 1, the first host connects, or couples, to the first data storage subsystem through the bus adapter 22, the interface bus 24, the adapter 26, the link 28, the interconnection network 30, and the link 32. To connect to the second data storage subsystem, the first host uses the same I/O path except the data passes through link 34, while the second host uses the same I/O components plus link 32 to communicate with the first data storage subsystem, or link 34 to communicate with the second data storage subsystem, or link 36 to the data storage subsystem N.

Figure 2:
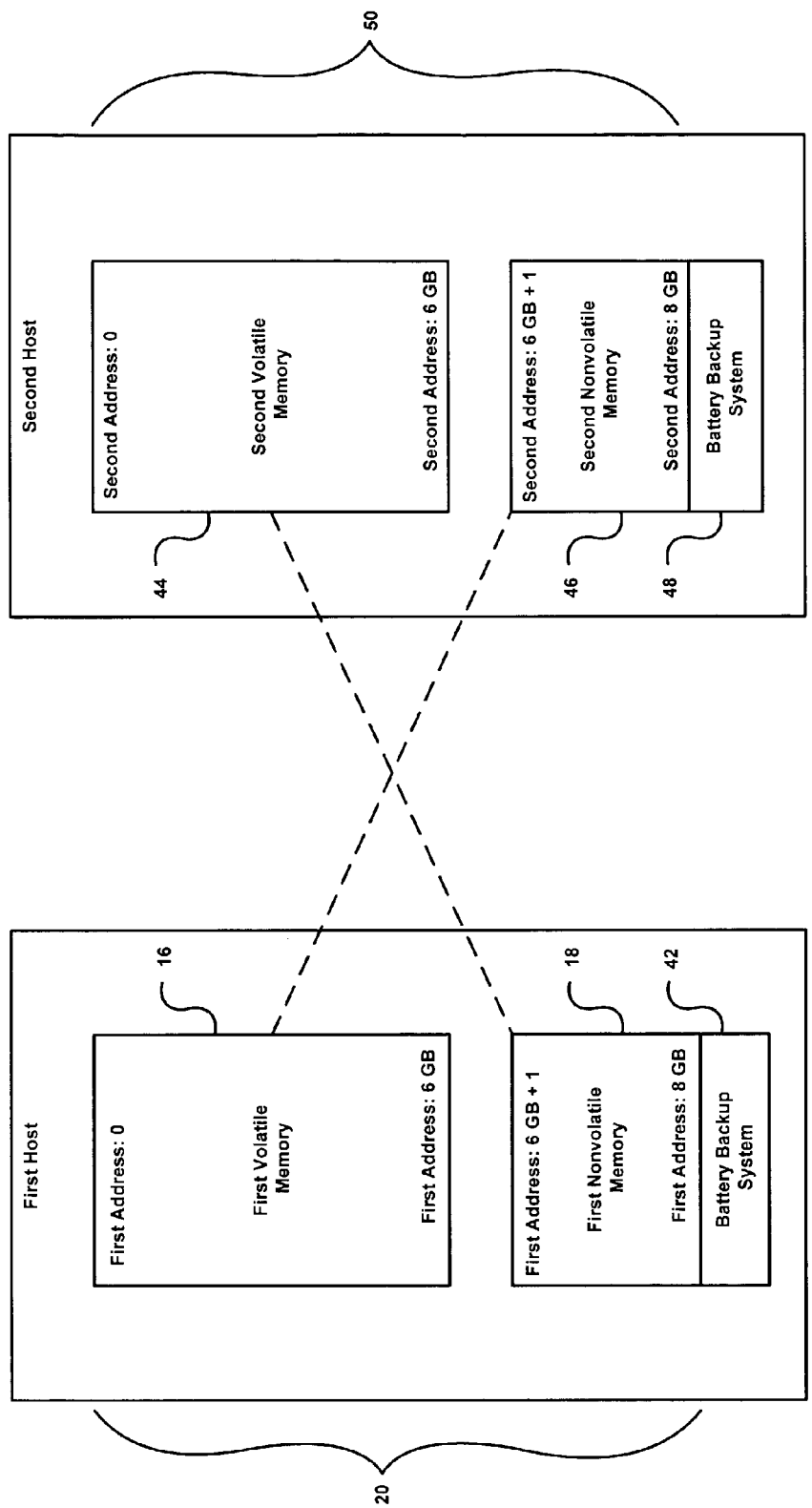
FIG. 2 illustrates an embodiment of each host's memory with illustrative ranges of memory addresses.

FIG. 2 illustrates the first host and the second host memory organization. In an embodiment, the first host memory 20 and the second host memory 50 is DRAM or another suitable volatile memory. The first host memory 20 is a physically contiguous address space; the second host memory 50 is another physically contiguous address space. A conventional battery backup system 42 supplies power to part of the first host memory 20, producing the first nonvolatile memory 18, while the remainder is not battery backed, that is, the first volatile memory 16. This reduces the capacity of the battery required, especially when the first volatile memory 16 is larger than the first nonvolatile memory 18. For example, the first volatile memory 16 allocation may be 6 GB and the first nonvolatile memory 18 allocation may be 2 GB. These DRAM sizes are merely illustrative, however, and those of ordinary skill will select based on cost-performance. The first nonvolatile memory 18 protects the data in the event of a power interruption or host failure as will be described. A battery backup system 42 is not required if the first nonvolatile memory 18 is inherently nonvolatile.

Similarly, in the second host, a battery backup system 48 provides power to part of the second host memory 50, producing the nonvolatile memory 46. Part of the memory is not battery backed remaining volatile memory 44. The second volatile memory 44 is a larger address space than the second nonvolatile memory 46 to reduce the size of the battery. The battery backup system 48 is conventional. The nonvolatile memory 46 protects the data in the event of a power interruption to the host. The battery backup system 48 is also not required if the nonvolatile memory 46 is inherently nonvolatile memory.

To handle cache data efficiently, the first host manages the first volatile memory 16, and the second nonvolatile memory 46 of the second host as indicated by the dotted line between the first volatile memory 16 and the second nonvolatile memory 46. Likewise, the second host owns or manages the second volatile memory 44 and the first nonvolatile memory 18 of the first host as indicated by the dotted line between the second volatile memory 44 and the first nonvolatile memory 18. By assigning management of the memory in this way, the data may be transmitted between the hosts with minimal communication overhead between the hosts to allocate and de-allocate addresses or map addresses within the host memories.

Figure 3:
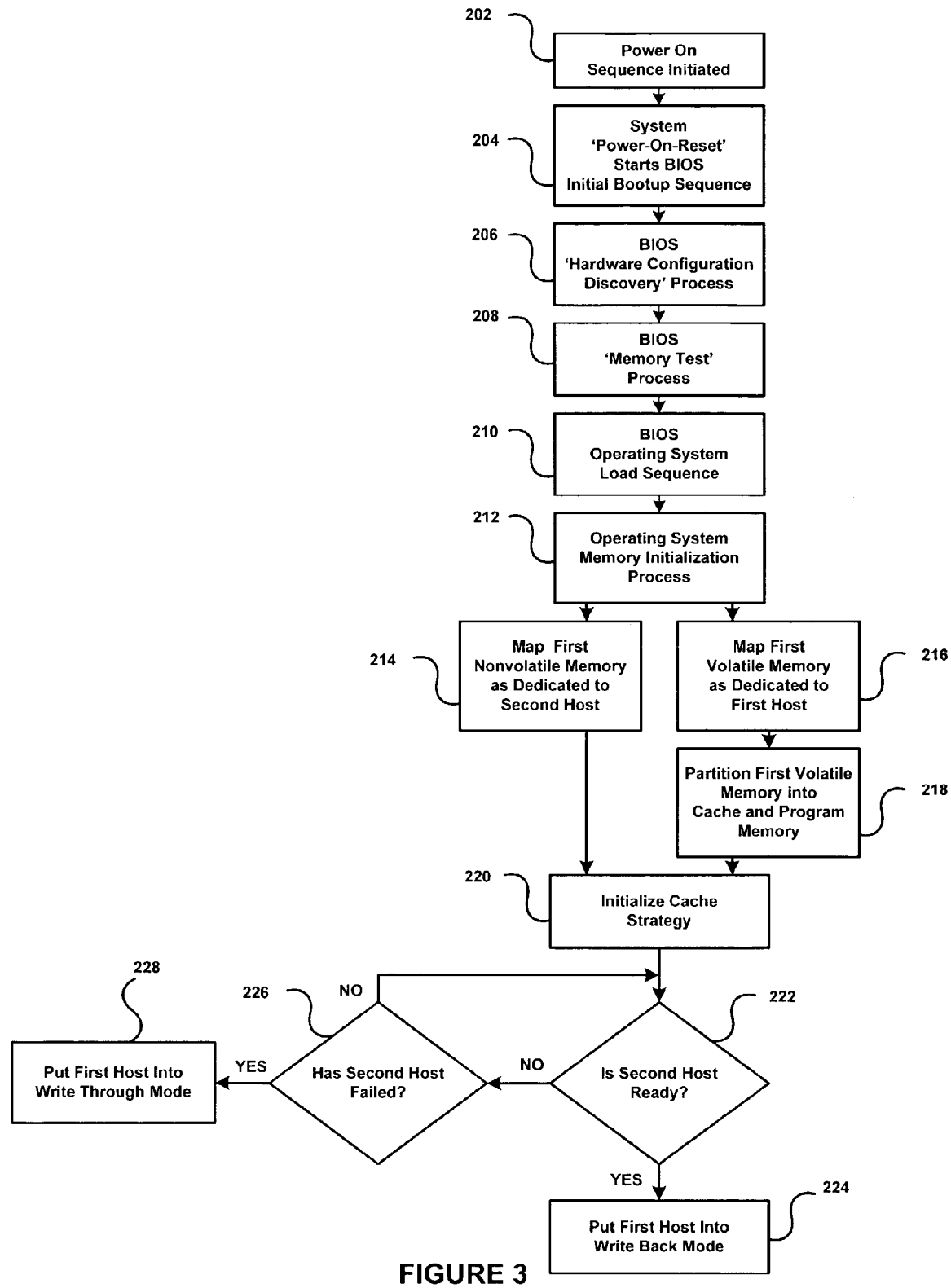
FIG. 3 is a flow chart of memory mapping allocations and implementation of write cache strategies.

FIG. 3 is a flow chart of an initialization algorithm that runs in each of the hosts. Each block represents a processing step, instructions, or groups of instructions. In step 202, the power is applied to the first host starting the initialization sequence. In step 204, the power-on-reset sequence starts a conventional BIOS boot up sequence. In step 206, the BIOS runs a conventional hardware configuration discovery process. In step 208, the BIOS runs a first host memory test process. In step 210, the BIOS loads the operating system into the first host memory. In step 212, the operating system runs the memory initialization process. In steps 214 and 216, the operating system maps the first volatile memory 16 as dedicated to the first host, and maps the first nonvolatile memory 18 as dedicated to the second host. In step 218, the operating system partitions the first volatile memory 16 into a region for cache and a region for program memory. In step 220, the operating system begins the initialization of write cache strategies. In step 222, the first host determines if the second host is ready. If so, in step 224, the first host is placed into write back mode. If not, in step 226, the first host checks if the second host has failed. If not, the process returns to step 222. If so, in step 228, the first host is placed into write through mode. The same type of algorithm runs in the second host.

Figure 4:
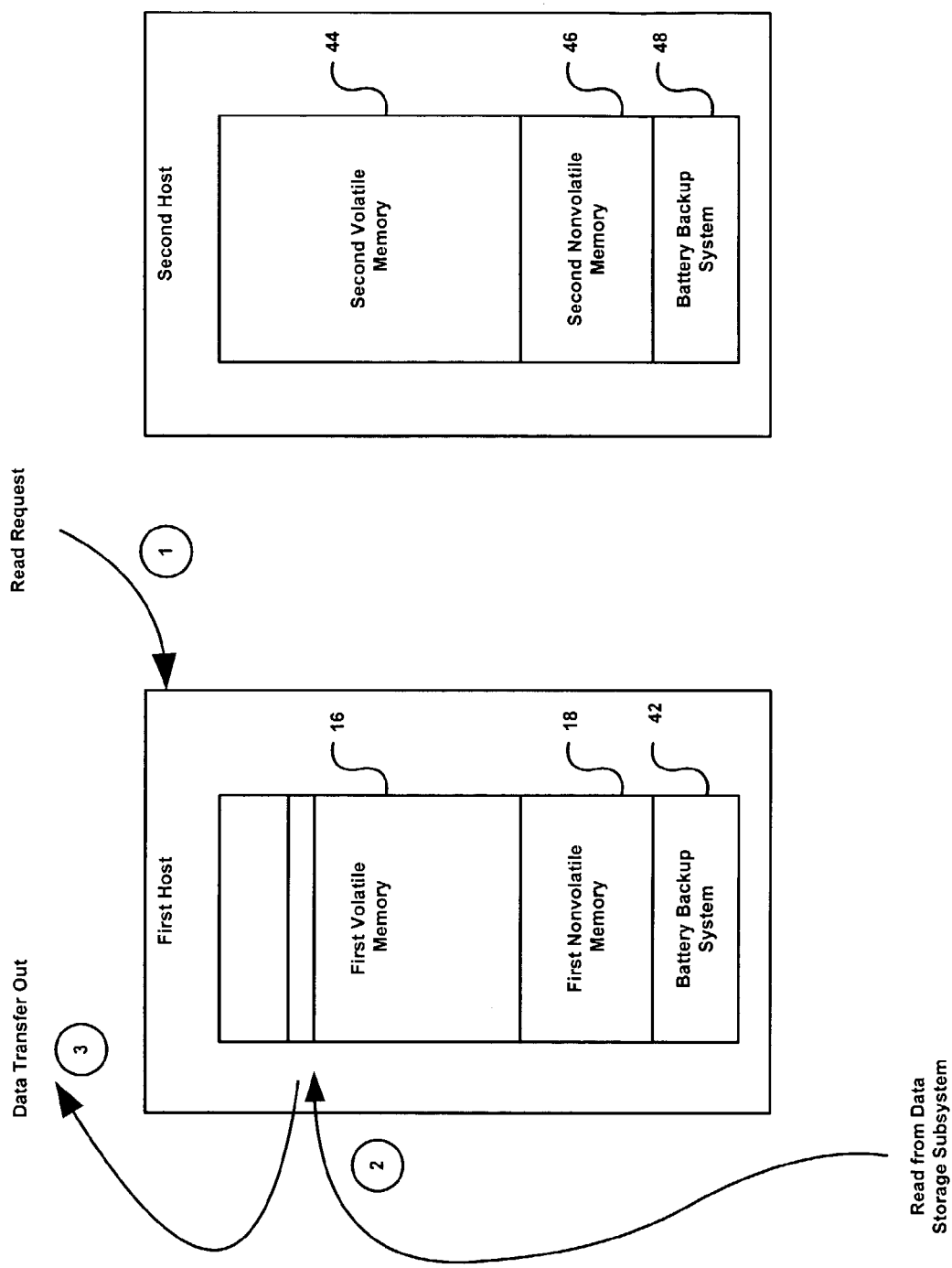
FIG. 4 illustrates an embodiment of the read operation, where a host misses the cache and retrieves the data from the data storage subsystem.

FIG. 4 illustrates an embodiment of a read operation, where the first host retrieves data from the data storage subsystem. In step 1, the first host receives a read request. The request is for data that is not in the cache portion of the first volatile memory 16, resulting in a cache miss. In step 2, the data is read from the data storage subsystem and placed in the first volatile memory 16. In step 3, the data is read from the first volatile memory 16 and transferred out from the first host. The same type of read operation can, of course, run in the second host.

Figure 5:
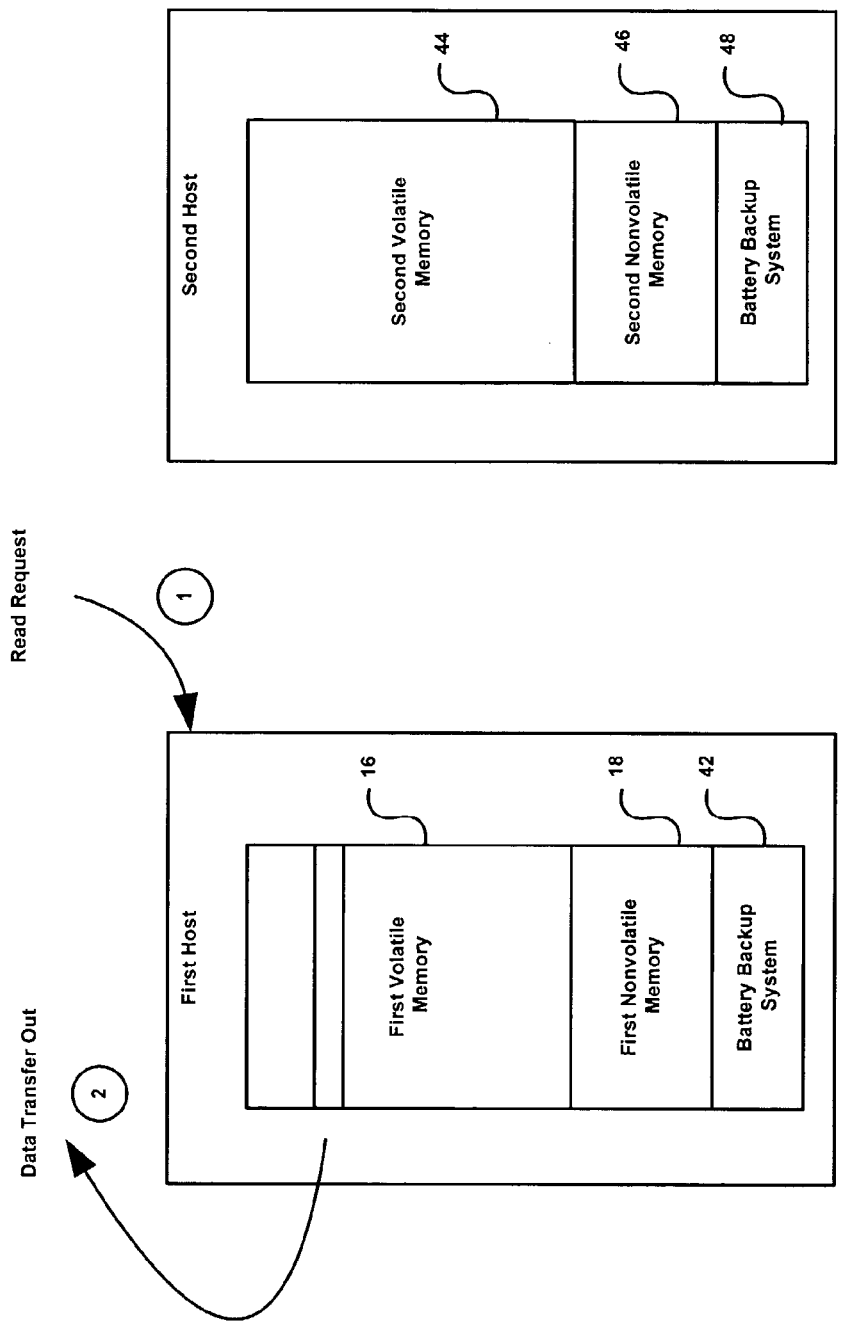
FIG. 5 illustrates an embodiment of the read operation, where a host hits the cache and retrieves the data from the first volatile memory.

FIG. 5 illustrates an embodiment of a read operation, where the first host retrieves data from the first volatile memory 16. In step 1, the first host receives a read request. The request is for the data that is in the cache portion of the first volatile memory 16. For example, it could be the data brought up from the data storage subsystem in the example described in connection with FIG. 4. In any event, this request results in a cache hit, and the data is read from the first volatile memory 16 and transferred out from the first host in step 2.

Figure 6:
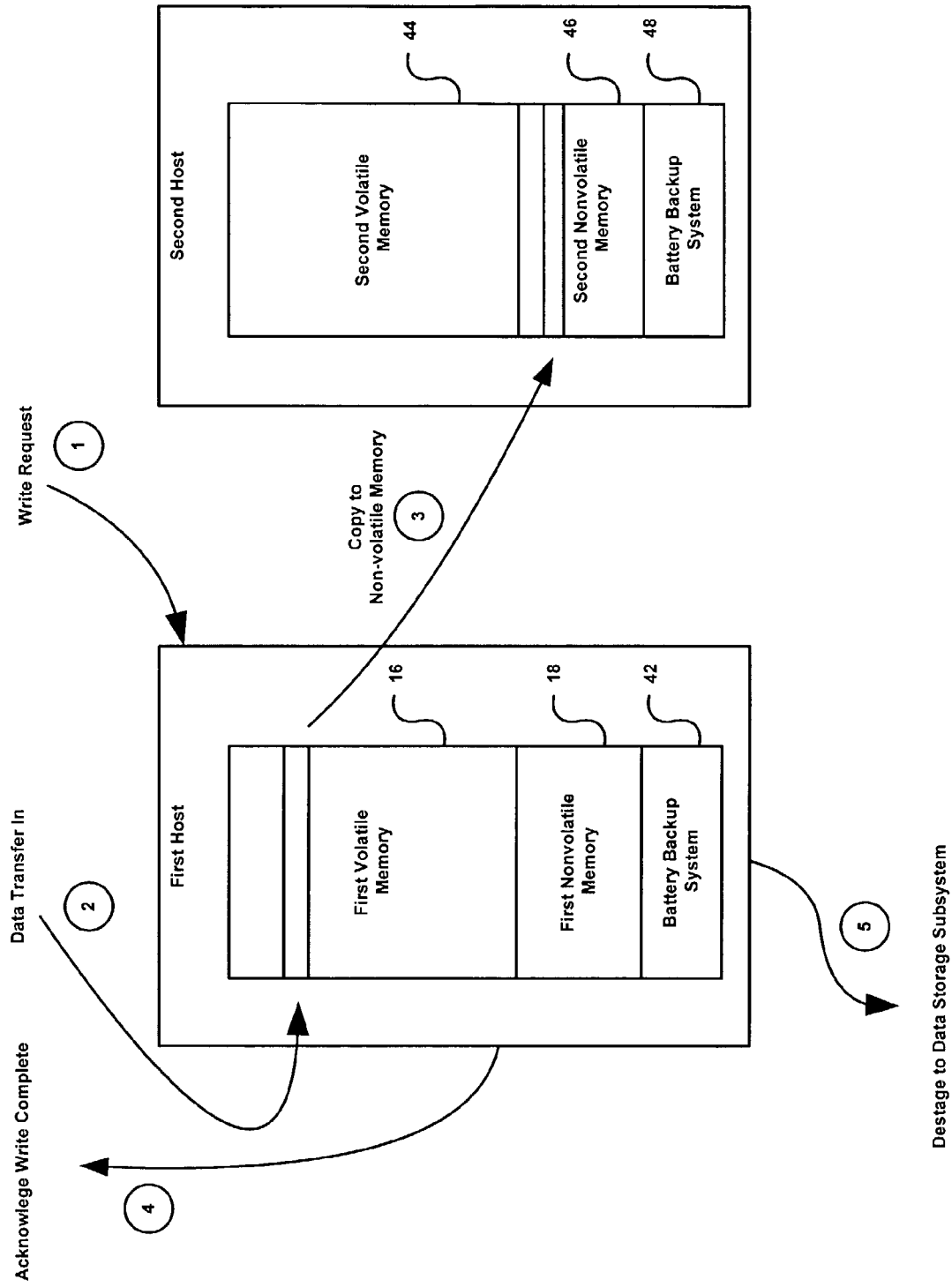
FIG. 6 illustrates an embodiment of the write operation showing the transfer of data between the hosts and destaging.

FIG. 6 illustrates an embodiment of a write operation in the first host. In step 1, the first host receives a write request. In step 2, the write data is written to the first volatile memory 16. In step 3, the first host transmits a copy of the write data to the second nonvolatile memory 46 of the second host. In step 4, the first host acknowledges that the write is complete. In step 5, the write data is destaged, that is, copied to the data storage subsystem.

Figure 7:
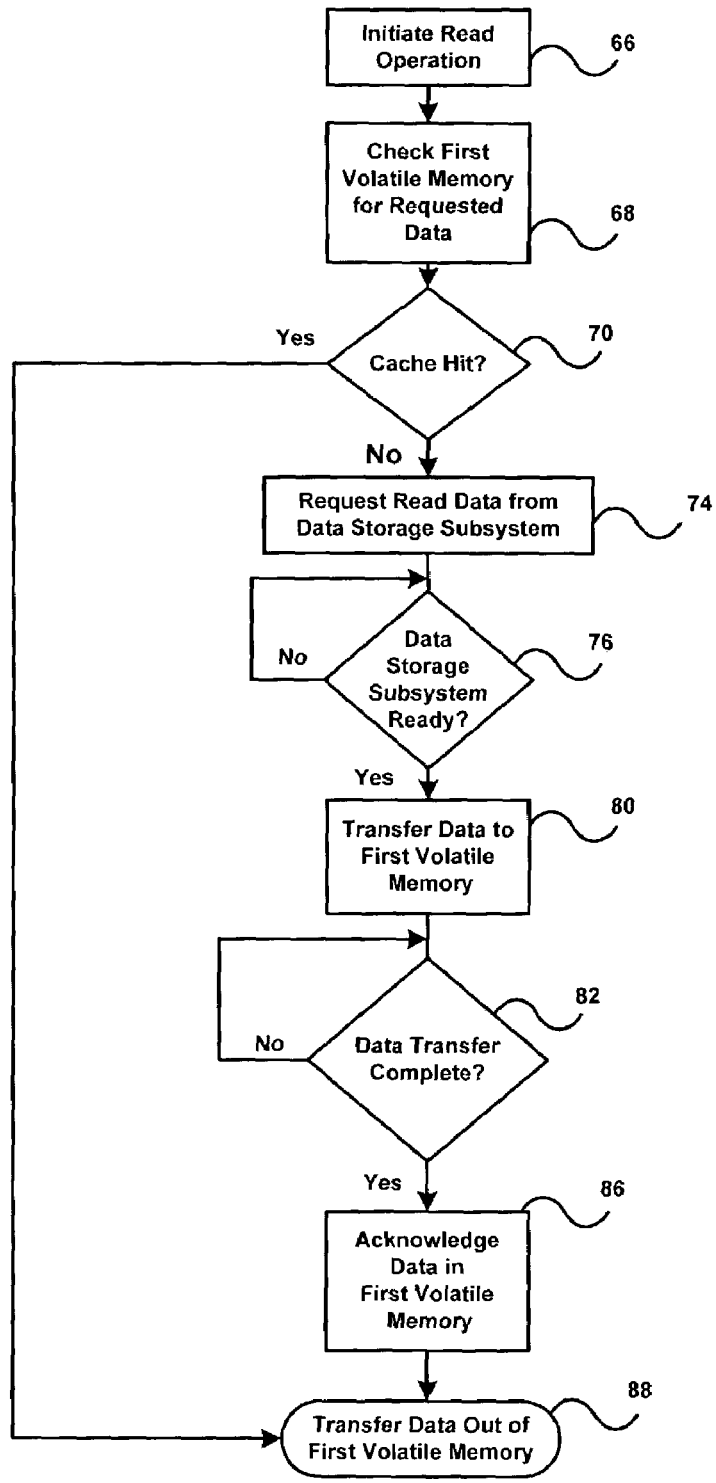
FIG. 7 is a flow chart of the read operation in a host.

FIG. 7 is a flow chart of a read operation for host caching. In step 66, the first host receives a read request, which initiates the read operation. In step 68, the first host checks the first volatile memory 16 for the requested data. If there is a cache hit in step 70, the first host transfers the data from the first volatile memory 16 in step 88. If there is a cache miss in step 70, the first host requests the data from the data storage subsystem in step 74. In step 76, the first host checks if the data storage subsystem is ready. If not, the first host waits. If ready, the first host initiates a data transfer from the data storage subsystem to the first volatile memory 16 in step 80. In step 82, the first host checks if the data transfer is complete. If not, the first host continues the data transfer to the first volatile memory 16. If complete, the first host acknowledges that the data is in the first volatile memory 16 in step 86. In step 88, the first host transfers the data from the first volatile memory 16.

Figure 8:
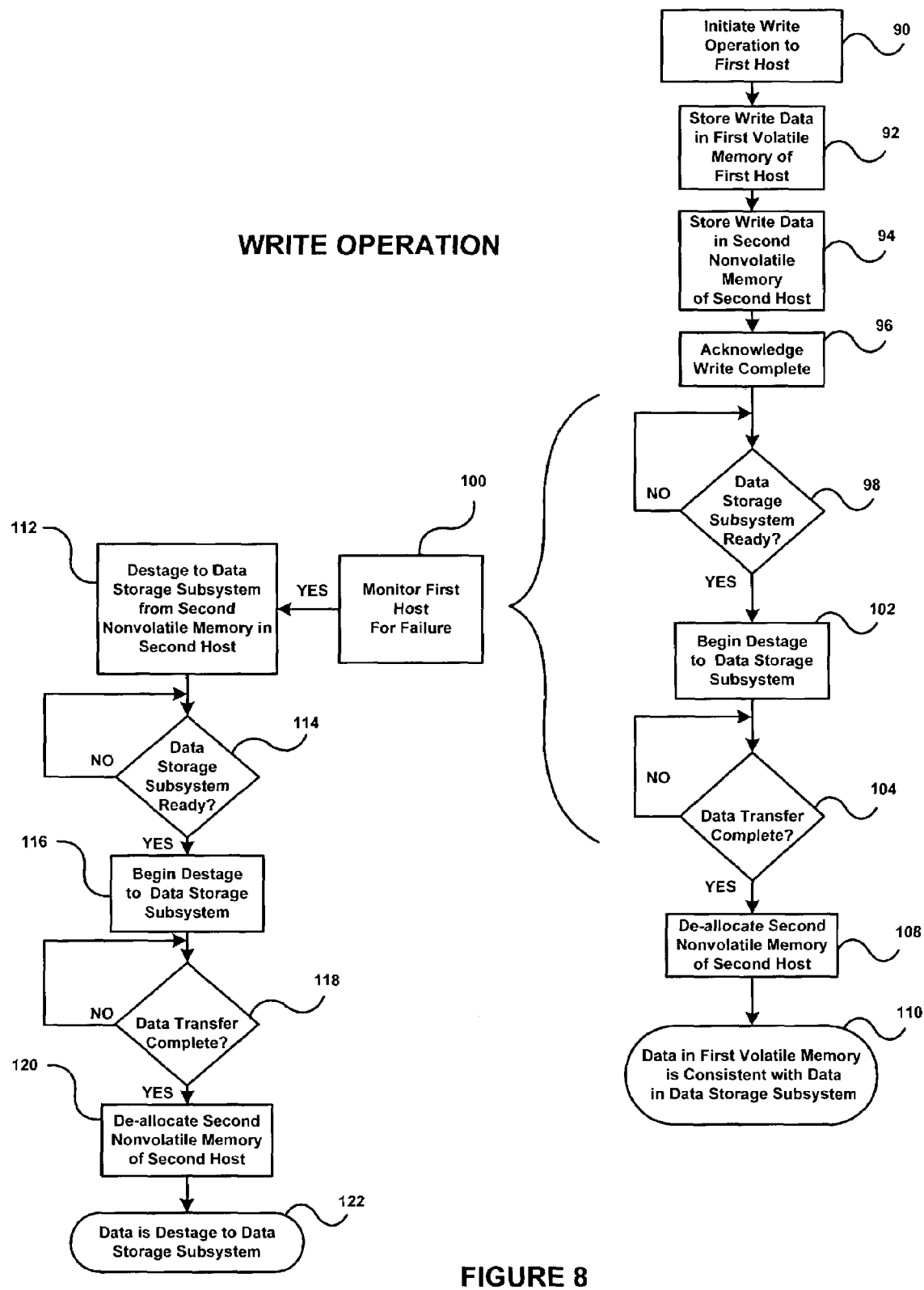
FIG. 8 is a flow chart of the write operation in a host.

FIG. 8 is a flow chart of a write operation in host caching. In step 90, the first host receives a write request, which initiates a write operation. In step 92, the first host stores write data in the first volatile memory 16. In step 94, the first host stores the write data in the second nonvolatile memory 46. In step 96, the first host acknowledges that the write operation is complete. In step 98, the first host checks if the data storage subsystem is ready for destaging. If not, the first host waits. If ready, the first host begins to destage the write data to the data storage subsystem in step 102. In step 104, the first host checks if the data transfer is complete. If not, the first host continues data transfer. If the data transfer is complete, the first host de-allocates the address space of the second nonvolatile memory 46 for other write data in step 108. As a result, in step 110 the data in the first volatile memory 16 is consistent with the data in the data storage subsystem.

In an embodiment, the first host and the second host monitor each other's health during operation. Between the time that the first host acknowledges that write is complete in step 96 and successful destaging in step 104, the second host may detect that the first host has failed (step 100). This causes the second host to begin a routine to destage the write data from the second nonvolatile memory 46 to the data storage subsystem in step 112. In step 114, the second host checks if the data storage subsystem is ready for destaging. If not, the second host waits. If ready, the second host begins to destage the write data to the data storage subsystem in step 116. In step 118, the second host checks if the data transfer is complete. If not, the second host continues the data transfer. If the data transfer is complete, the second host de-allocates the address space of the second nonvolatile memory 46 in step 120. As a result, in step 122 the data is destaged to the data storage subsystem.

Figure 9:
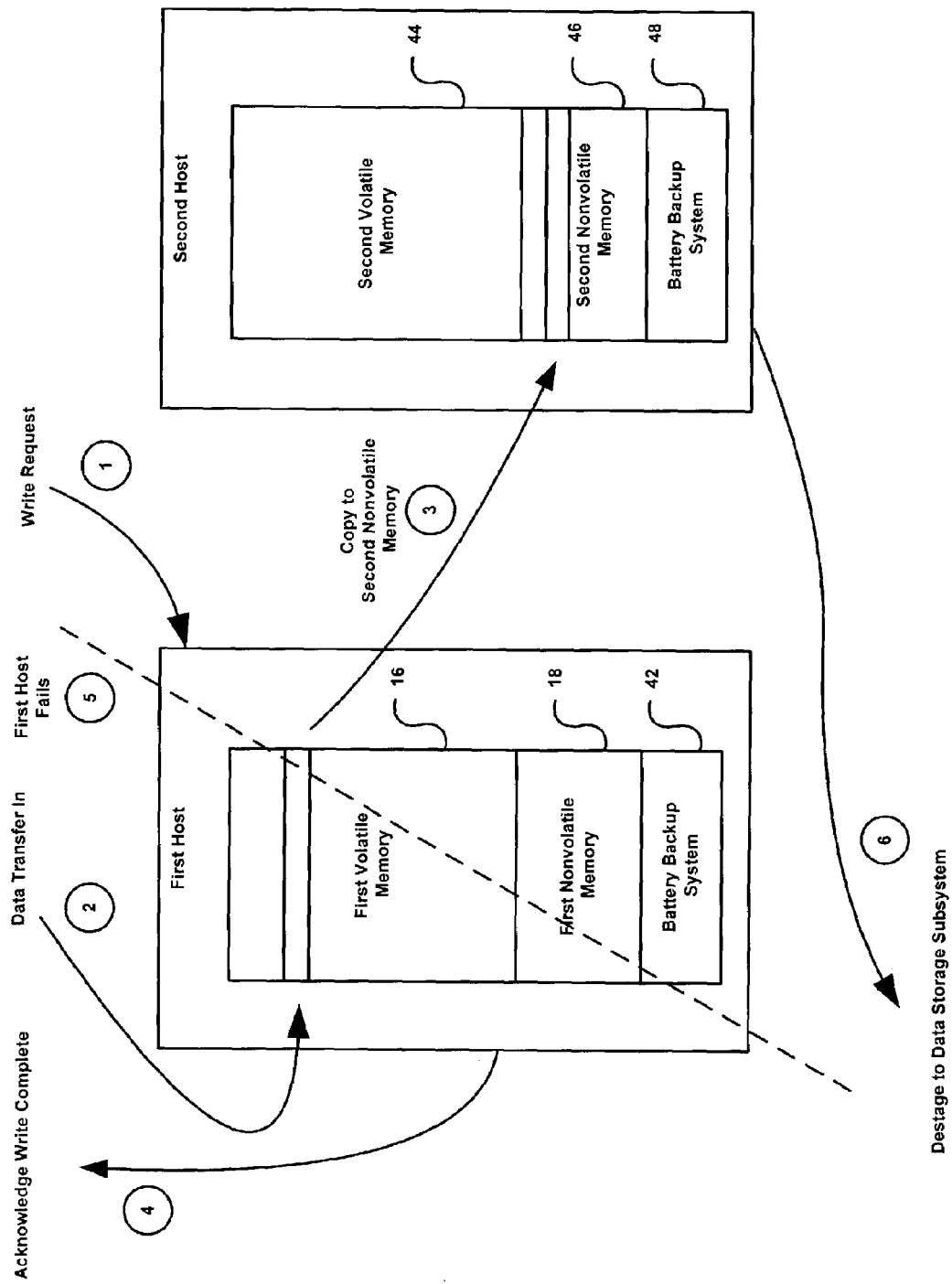
FIG. 9 illustrates where the second host completes the destaging operation for a failed first host.

FIG. 9 illustrates an embodiment when the first host fails after a write acknowledgment, but before destaging has occurred. In this event, the second host completes the destaging operation for a first host as will be described. In step 1, the first host receives a write request. In step 2, the write data is written to the first volatile memory 16. In step 3, the first host will transmit a mirror copy of the write data to the second nonvolatile memory 46. In step 4, the first host acknowledges that the write is complete. In step 5, the first host fails as indicated by the dotted line. This failure can be from a power interruption to the first host or simply a software or hardware failure in the first host. In any event, the second host after detecting the power interruption or failure in the first host can destage the write data in the second nonvolatile memory 46 to the data storage subsystem in step 6.

Figure 10:
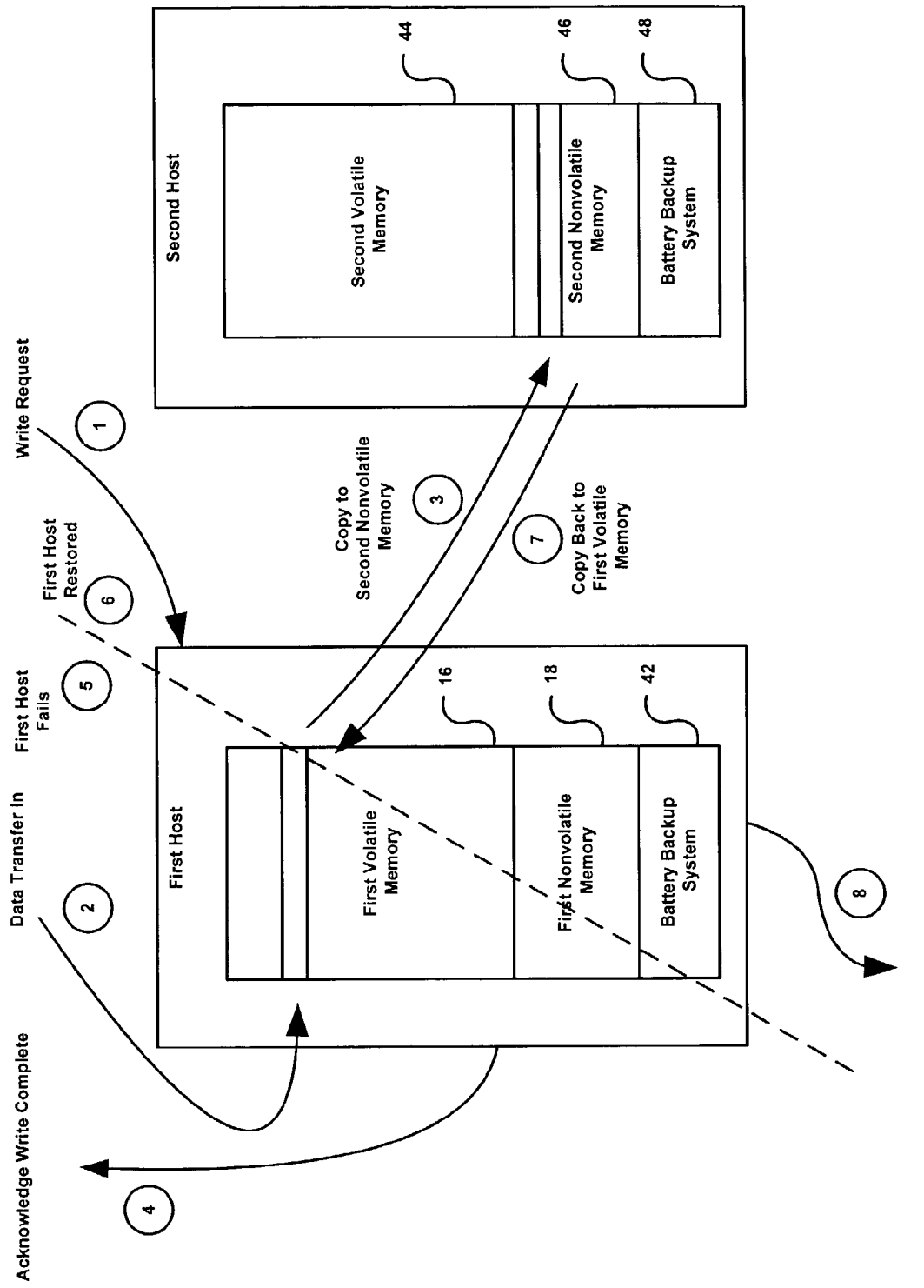
FIG. 10 illustrates where the second host transmits write data to the first host after the first host is restored to operation.

FIG. 10 illustrates when the second host transmits write data to the first host after the first host is restored to operation. In step 1, the first host receives a write request. In step 2, the write data is written to the first volatile memory 16. In step 3, the first host transmits a mirror copy of the write data to the second nonvolatile memory 46. In step 4, the first host acknowledges that the write is complete. In step 5, however, the first host fails as indicated by the dotted line. This failure can be from a power interruption to the first host or simply a software or hardware failure in the first host. In step 6, the first host is restored to operation. In step 7, the second host performs a copy back to the first volatile memory 16. In step 8, the first host can destage the write data from the first volatile memory 16 to the data storage subsystem.

What is claimed:

1. A host caching system, comprising:
   a first host including a first volatile memory and a first nonvolatile memory, wherein the first volatile memory and the first nonvolatile memory is a first physically contiguous address space;
   a second host including a second volatile memory and a second nonvolatile memory, wherein the second volatile memory and the second nonvolatile memory is a second physically contiguous address space;
   an interconnect coupling the first host and the second host; and
   wherein first software under control of the first host maps:
      the addresses of the first volatile memory to the first host,
      the addresses of the first nonvolatile memory to the second host,
   wherein second software under control of the second host maps:
      the addresses of the second volatile memory to the second host,
      the addresses of the second nonvolatile memory to the first host, wherein in response to a write request received by the first host, the first host stores the write data in the first volatile memory, transmits the write data through the interconnect, stores the write data in the second nonvolatile memory, and acknowledges the write operation is complete.

2. The system of claim 1, further comprising data storage subsystem(s), wherein the first host destages the write data to the data storage subsystem(s) after the first host acknowledges the write operation is complete.

3. The system of claim 1, further comprising data storage subsystem(s), wherein the second host destages the write data in the second nonvolatile memory to the data storage subsystem(s) when the first host fails in operation after the first host acknowledges the write operation is complete.

4. The system of claim 2 or 3, wherein the data storage subsystem(s) include Serial Advanced Technology Attachment (SATA) storage devices.

5. The system of claim 1, wherein the interconnect supports dedicated communications between the first host and the second host.

6. The system of claim 1, wherein the interconnect is an interconnect network coupled to the first host and the second host through links.

7. The system of claim 1, wherein the first software maps the addresses of the first volatile memory to the first host and the first nonvolatile memory to the second host during execution of a first initialization algorithm, and the second software maps the addresses of the second volatile memory to the second host and the second nonvolatile memory to the first host during execution of a second initialization algorithm.

8. The system of claim 1, 2, 3, 5, 6, or 7, further comprising a first battery coupled to the first nonvolatile memory and a second battery coupled to the second nonvolatile memory.

9. The system of claim 3, wherein the first host is held inactive and the second host performs destaging of the write data from the second nonvolatile memory to the data storage subsystem(s).

10. The system of claim 1, further comprising data storage subsystem(s), wherein the first host fails in operation and the second host re-transmits the write data from the second nonvolatile memory to the volatile memory of the first host after the first host is back in operation.

11. The system of claim 4, further comprising at least one battery coupled to the first nonvolatile memory and the second nonvolatile memory.

12. A method of executing a write operation in a first host and a second host, wherein the first host includes a first host memory of physically contiguous address space partitioned into first volatile and first nonvolatile memories and the second host includes a second host memory of physically contiguous address space partitioned into second volatile and second nonvolatile memories, comprising:
   receiving a write request along with write data in the first host;
   storing the write data in the first volatile memory;
   copying the write data in the second nonvolatile memory; and
   acknowledging the write is complete after storing the write data in the second nonvolatile memory.

13. The method of claim 12, further comprising providing data storage subsystem(s) and destaging the write data to the data storage subsystem(s) after the first host acknowledges the write operation is complete.

14. The method of claim 12, further comprising providing a data storage subsystem(s) and destaging the write data to the data storage subsystem(s) in the event the first host fails after acknowledging the write is complete.

15. The method of claim 14, further comprising holding the first host inactive and using the second host to perform destaging of the write data from the second nonvolatile memory to the data storage subsystem(s).

16. The method of claim 14, further comprising restoring the operation of the first host and transmitting the write data from the second nonvolatile memory to the first volatile memory to perform destaging of the write data to the data storage subsystem(s).

17. The method of claim 13, 14, 15, or 16, wherein the data storage subsystem(s) include Serial Advanced Technology Attachment (SATA) storage devices.

18. The method of claim 12, further comprising the step of communicating the write data from the first host to the second nonvolatile memory by bus, SAN, LAN, or WAN technology.

19. The method of claim 12, further comprising address mapping the first volatile memory and the second nonvolatile memory to the first host, and address mapping the second volatile memory and the first nonvolatile memory to the second host.

20. The method of claim 12, wherein the copying is performed over a dedicated interconnect.

21. The method of claim 12, wherein the copying is performed over an interconnect network.

22. A host caching system, comprising:
a first host including a first volatile memory and a first nonvolatile memory, wherein the first volatile memory and the first nonvolatile memory is allocated in a first physically contiguous address space;

a second host including a second volatile memory and a second nonvolatile memory, wherein the second volatile memory and the second nonvolatile memory is allocated in a second physically contiguous address space;

an interconnect coupling the first host and the second host; and wherein first software under control of the first host allocates:
the addresses of the first volatile memory to the first host,
the addresses of the first nonvolatile memory to the second host,
wherein the second host fails and wherein in response to a write request received by the first host, the first host stores the write data in the first volatile memory, destages the write data, and acknowledges the write operation is complete.

23. The system of claim, 22, further comprising at least one data storage subsystem having an array of Serial Advanced Technology Attachment (SATA) storage devices.

24. The system of claim 22, wherein the first software maps the addresses of the first volatile memory to the first host and the first nonvolatile memory to the second host during execution of an initialization algorithm.

25. The system of claim 22, 23, or 24, further comprising a first battery coupled to the first nonvolatile memory and a second battery coupled to the second nonvolatile memory.

* * * * *